(12) United States Patent
Yang et al.

(10) Patent No.: US 10,187,597 B2
(45) Date of Patent: Jan. 22, 2019

(54) ACTIVE PIXEL SENSOR CIRCUIT, DRIVING METHOD AND IMAGE SENSOR

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Hailin Xue, Beijing (CN); Xiaochuan Chen, Beijing (CN); Haisheng Wang, Beijing (CN); Yingming Liu, Beijing (CN); Weijie Zhao, Beijing (CN); Xiaoliang Ding, Beijing (CN); Chunlei Wang, Beijing (CN); Wei Li, Beijing (CN); Zebin Sun, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/574,458

(22) PCT Filed: Mar. 17, 2017

(86) PCT No.: PCT/CN2017/077083
§ 371 (c)(1),
(2) Date: Nov. 15, 2017

(87) PCT Pub. No.: WO2017/197969
PCT Pub. Date: Nov. 23, 2017

(65) Prior Publication Data
US 2018/0249109 A1     Aug. 30, 2018

(30) Foreign Application Priority Data
May 20, 2016  (CN) .......................... 2016 1 0341437

(51) Int. Cl.
*H04N 5/374* (2011.01)
*H04N 5/3745* (2011.01)
(Continued)

(52) U.S. Cl.
CPC .......... *H04N 5/3745* (2013.01); *H04N 5/365* (2013.01); *H04N 5/378* (2013.01)

(58) Field of Classification Search
None
See application file for complete search history.

(56) References Cited

U.S. PATENT DOCUMENTS

| 6,873,359 B1 * | 3/2005 | Kozlowski | H04N 5/3745 250/208.1 |
| 6,975,356 B1 * | 12/2005 | Miyamoto | H04N 5/3575 348/300 |

(Continued)

FOREIGN PATENT DOCUMENTS

| CN | 1791184 A | 6/2006 |
| CN | 102957880 A | 3/2013 |

(Continued)

OTHER PUBLICATIONS

International Search Report and Written Opinion in PCT/CN2017/077083 dated Jun. 22, 2017, with English translation.

(Continued)

*Primary Examiner* — James Hannett
(74) *Attorney, Agent, or Firm* — Womble Bond Dickinson (US) LLP

(57) ABSTRACT

The present disclosure provides an active pixel sensor circuit, a driving method, and an image sensor. The active pixel sensor circuit comprises a photosensitive device, a first (Continued)

storage capacitor, a second storage capacitor and a source follower transistor. The active pixel sensor circuit further comprises a reset sub-circuit, a charging control sub-circuit, a compensation control sub-circuit, a signal-reading control sub-circuit. The charging control sub-circuit controls a second pole of the photosensitive device to be connected to a second terminal of the second storage capacitor during the reset phase and the charging phase, and controls the gate of the source follower transistor to be connected to a second pole of the source follower transistor during the charging phase. The compensation control sub-circuit controls the second terminal of the second storage capacitor to be connected to a second terminal of the first storage capacitor during the reset phase and the compensation phase.

20 Claims, 4 Drawing Sheets

(51) Int. Cl.
    *H04N 5/365*     (2011.01)
    *H04N 5/378*     (2011.01)

(56) References Cited

U.S. PATENT DOCUMENTS

| | | | |
|---|---|---|---|
| 7,420,602 B2 * | 9/2008 | Fraenkel | H04N 5/2178 250/208.1 |
| 7,750,958 B1 * | 7/2010 | Dierickx | H01L 27/14609 250/208.1 |
| 2005/0092895 A1 | 5/2005 | Fossum | |
| 2006/0038208 A1 * | 2/2006 | Terzioglu | H04N 5/235 257/292 |
| 2008/0054164 A1 | 3/2008 | Johansson | |
| 2009/0101798 A1 * | 4/2009 | Yadid-Pecht | H04N 5/3532 250/208.1 |
| 2011/0062314 A1 * | 3/2011 | Doege | H01L 27/14643 250/214 R |
| 2014/0224961 A1 * | 8/2014 | Nelson | G01J 1/4228 250/206 |

FOREIGN PATENT DOCUMENTS

| | | |
|---|---|---|
| CN | 103139497 A | 6/2013 |
| CN | 105789202 A | 7/2016 |
| TW | 200822710 A | 5/2008 |

OTHER PUBLICATIONS

Office Action received for Chinese Patent Application No. 201610341437.0, dated May 29, 2018, 6 pages (1 page of English Translation and 5 pages of Office Action).

* cited by examiner

ACTIVE PIXEL SENSOR CIRCUIT, DRIVING METHOD AND IMAGE SENSOR

RELATED APPLICATION

The present application is the U.S. national phase entry of PCT/CN2017/077083, with an international filing date of Mar. 17, 2017, which claims the benefit of Chinese Patent Application No. 201610341437.0, filed on May 20, 2016, the entire disclosure of which is incorporated herein by reference.

FIELD

The present disclosure relates to the field of active pixel sensing technology, and particularly to an active pixel sensor circuit, a driving method and an image sensor.

BACKGROUND

A Complementary Metal-oxide Semiconductor (CMOS) image sensor is capable of transforming the function of pure logic operation into receiving external light rays, converting them into electric energy and transmitting it out.

For an active pixel sensor (APS) circuit, as the most common detection circuit of a CMOS image sensor, during the process of photoelectric conversion performed by a photosensitive device, the difference in the process of source follower thin film transistors (TFT) themselves causes the threshold voltages thereof to be non-uniform, and the output current of the source follower TFTs would be affected by the threshold voltage thereof, thus the output current of the source follower TFTs is non-uniform, resulting in distortion in the final image.

SUMMARY

The main objective of the present disclosure is to provide an active pixel sensor circuit, a driving method and an image sensor, which are capable of at least partially alleviating or eliminating the above-mentioned defects in the prior art.

To achieve the above objective, the present disclosure provides an active pixel sensor circuit comprising: a photosensitive device, a first storage capacitor, a second storage capacitor and a source follower transistor. A first pole of the photosensitive device is connected to a first level line, a first terminal of the second storage capacitor is connected to the first level line, a gate of the source follower transistor is connected to a first terminal of the first storage capacitor, and a first pole of the source follower transistor is connected to a second level line.

The active pixel sensor circuit further comprises a reset sub-circuit, a charging control sub-circuit, a compensation control sub-circuit and a signal-reading control sub-circuit.

The reset sub-circuit is connected to the first terminal of the first storage capacitor and a second terminal of the first storage capacitor, respectively and configured to control the first terminal of the first storage capacitor to be connected to a first reset voltage line during a reset phase, and control the second terminal of the first storage capacitor be connected to a second reset voltage line.

The charging control sub-circuit is connected to a second pole of the photosensitive device, a second terminal of the second storage capacitor, the gate of the source follower transistor and a second pole of the source follower transistor, respectively and configured to control the second pole of the photosensitive device to be connected to the second terminal of the second storage capacitor during the reset phase and a charging phase, and control the gate of the source follower transistor to be connected to the second pole of the source follower transistor during the charging phase.

The compensation control sub-circuit is connected to the second terminal of the second storage capacitor and the second terminal of the first storage capacitor, respectively and configured to control the second terminal of the second storage capacitor to be connected to the second terminal of the first storage capacitor during the reset phase and a compensation phase.

The signal-reading control sub-circuit is connected to a photocurrent signal reading line and the second pole of the source follower transistor, respectively and configured to control the photocurrent signal reading line to be connected to the second pole of the source follower transistor during a signal reading phase.

In some embodiments, the reset sub-circuit is further connected to a reset control signal line and configured to control the first terminal of the first storage capacitor to be connected to the first reset voltage line under the control of a reset control signal during the reset phase, and control the second terminal of the first storage capacitor to be connected to the second reset voltage line.

The charging control sub-circuit is further connected to a first charging control signal line and a second charging control signal line, respectively and configured to control the second pole of the photosensitive device to be connected to the second terminal of the second storage capacitor under the control of a first charging control signal during the reset phase and the charging phase, and control the gate of the source follower transistor to be connected to the second pole of the source follower transistor under the control of a second charging control signal during the charging phase.

The compensation control sub-circuit is further connected to a compensation control signal line and configured to control the second terminal of the second storage capacitor to be connected to the second terminal of the first storage capacitor under the control of a compensation control signal during the reset phase and the compensation phase.

The signal-reading control sub-circuit is further connected to a reading control signal line and configured to control the photocurrent signal reading line to be connected to the second pole of the source follower transistor under the control of a reading control signal during the signal reading phase.

In some embodiments, the reset sub-circuit comprises a first reset transistor and a second reset transistor.

A gate of the first reset transistor is connected to the reset control signal line, a first pole of the first reset transistor is connected to the first reset voltage line, and a second pole of the first reset transistor is connected to the first terminal of the first storage capacitor.

A gate of the second reset transistor is connected to the reset control signal line, a first pole of the second reset transistor is connected to the second reset voltage line, and a second pole of the second reset transistor is connected to the second terminal of the first storage capacitor.

In some embodiments, the charging control sub-circuit comprises a first charging control transistor and a second charging control transistor.

A gate of the first charging control transistor is connected to the first charging control signal line, a first pole of the first charging control transistor is connected to the second pole of the photosensitive device, and a second pole of the first charging control transistor is connected to the second terminal of the second storage capacitor.

A gate of the second charging control transistor is connected to the second charging control signal line, a first pole of the second charging control transistor is connected to the gate of the source follower transistor, and a second pole of the second charging control transistor is connected to the second pole of the source follower transistor.

In some embodiments, the compensation control sub-circuit comprises a compensation control transistor, wherein a gate of the compensation control transistor is connected to the compensation control signal line, a first pole of the compensation control transistor is connected to the second terminal of the first storage capacitor, and a second pole of the compensation control transistor is connected to the second terminal of the second storage capacitor.

In some embodiments, the signal-reading control sub-circuit comprises a signal-reading control transistor, wherein a gate of the signal-reading control transistor is connected to the reading control signal line, a first pole of the signal-reading control transistor is connected to the second pole of the source follower transistor, and a second pole of the signal-reading control transistor is connected to the photocurrent signal reading line.

In some embodiments, the photosensitive device comprises a photodiode.

In some embodiments, the source follower transistor, the first reset transistor, the second reset transistor, the first charging control transistor, the second charging control transistor, the compensation control transistor, and the signal-reading control transistor are all p-type transistors, a second level is a high level, and a first level is a low level.

The present disclosure further provides a driving method for an active pixel sensor circuit for use in the active pixel sensor circuit described above. The driving method comprises a reset step, a charging step, a compensation step and a signal reading step.

In the reset step, during the reset phase the reset sub-circuit controls a first reset voltage to be written into the first terminal of the first storage capacitor and controls a second reset voltage to be written into the second terminal of the first storage capacitor; the compensation control sub-circuit controls the second reset voltage to be written into the second terminal of the second storage capacitor; the charging control sub-circuit controls the second reset voltage to be written into the second pole of the photosensitive device so that the photosensitive device is reversely biased.

In the charging step, during the charging phase, the charging control sub-circuit controls the second pole of the photosensitive device to be connected to the second terminal of the second storage capacitor, and the photosensitive device is irradiated with incident light so that a potential of the second terminal of the second storage capacitor becomes a photosensitive potential Vdata. The photosensitive potential Vdata is stored in the second storage capacitor. The charging control sub-circuit further controls the gate of the source follower transistor to be connected to the second pole of the source follower transistor. At that time, a potential of the gate of the source follower transistor is the first reset voltage, so that the source follower transistor is turned on until the potential of the gate of the source follower transistor is $V2-|Vth|$, wherein V2 is the second level and Vth is a threshold voltage of the source follower transistor.

In the compensation step, during the compensation phase, the compensation control sub-circuit controls the second terminal of the second storage capacitor to be connected to the second terminal of the first storage capacitor so that the photosensitive potential Vdata stored in the second storage capacitor is written into the second terminal of the first storage capacitor. The potential of the first terminal of the first storage capacitor undergoes an equal-voltage jump such that the potential of the gate of the source follower transistor jumps to $V2-|Vth|+Vdata$.

In the signal reading step, during the signal reading phase, the signal-reading control sub-circuit controls the photocurrent signal reading line to be connected to the second pole of the source follower transistor, and the source follower transistor is turned on. At that time, the gate-source voltage of the source follower transistor compensates the threshold voltage of the source follower transistor so that the operating current of the source follower transistor is independent of the threshold voltage, and the operating current is read via the photocurrent signal reading line.

The present disclosure further provides a driving method for an active pixel sensor circuit for use in the active pixel sensor circuit described above. The driving method comprises a reset step, a charging step, a compensation step and a signal reading step.

In the reset step, during the reset phase the reset control signal, the first charging control signal and the compensation control signal are all at a low level, and the first reset transistor, the second reset transistor, the first charging control transistor and the compensation control transistor are all turned on. A first reset voltage is written into the first terminal of the first storage capacitor, and the second storage capacitor is connected to a cathode of the photodiode so that the photodiode is reversely biased, and a PN junction capacitor of the photodiode is charged by a second reset voltage.

In the charging step, during the charging phase the first charging control signal and the second charging control signal are both at a low level, the first charging control transistor and the second charging control transistor are both turned on, the photodiode is irradiated with incident light so that a potential of the second terminal of the second storage capacitor becomes a photosensitive potential Vdata, and the photosensitive potential Vdata is stored in the second storage capacitor. At that time, a potential of the gate of the source follower transistor is the first reset voltage so that the source follower transistor is turned on until the potential of the gate of the source follower transistor is $Vdd-|Vth|$, wherein Vdd is a high level applied to the first pole of the source follower transistor, and Vth is the threshold voltage of the source follower transistor.

In the compensation step, during the compensation phase the compensation control signal is at a low level, thus the compensation control transistor is turned on so that the photosensitive potential Vdata stored in the second storage capacitor is written into the second terminal of the first storage capacitor. The potential of the first terminal of the first storage capacitor undergoes an equal-voltage jump such that the potential of the gate of the source follower transistor jumps to $Vdd-|Vth|+Vdata$.

In the signal reading step, during the signal reading phase the reading control signal is at a low level, thus the signal-reading control transistor is turned on. At that time the potential of the gate of the source follower transistor is $Vdd-|Vth|+Vdata$, the source follower transistor is turned on, and the operating current of the source follower transistor is $K \times Vdata^2$. The operating current is read via the photocurrent signal reading line, wherein K is a current coefficient of the source follower transistor.

In some embodiments, the reset step further comprises: during the reset phase, the second charging control signal and the reading control signal are both at a high level, and the second charging control transistor and the signal-reading control transistor are both turned off.

The charging step further comprises: during the charging phase, the reset control signal, the compensation control signal and the reading control signal are all at a high level, and the first reset transistor, the second reset transistor, the compensation control transistor and the signal-reading control transistor are all turned off.

The compensation step further comprises: during the compensation phase, the reset control signal, the first charging control signal, the second charging control signal and the reading control signal are all at a high level, and the first reset transistor, the second reset transistor, the first charging control transistor, the second charging control transistor, and the signal-reading control transistor are all turned off.

The signal reading step further comprises: during the signal reading phase, the reset control signal, the first charging control signal, the second charging control signal and the compensation control signal are all at a high level, and the first reset transistor, the second reset transistor, the first charging control transistor, the compensation control transistor and the second charging control transistor are all turned off.

The present disclosure further provides an image sensor comprising the active pixel sensor circuit described above.

Compared with the prior art, the active pixel sensor circuit, the driving method and the image sensor according to the present disclosure can solve the problem of non-uniform output current resulting from the difference in the source follower transistor per se by means of voltage jump compensation using a reset sub-circuit, a charging control sub-circuit and a compensation sub-circuit, so that the output current is independent of the threshold voltage of the source follower transistor.

DETAILED DESCRIPTION

Technical solutions in embodiments of the present disclosure will be described below in a clear and complete manner with reference to the accompanying drawings in the embodiments of the present disclosure. Apparently, the described embodiments are merely part of the embodiments of the present disclosure, rather than all of them. All other embodiments obtained by those ordinarily skilled in the art based on the embodiments of the present disclosure without spending inventive efforts are within the scope of the present disclosure.

Figure 1:
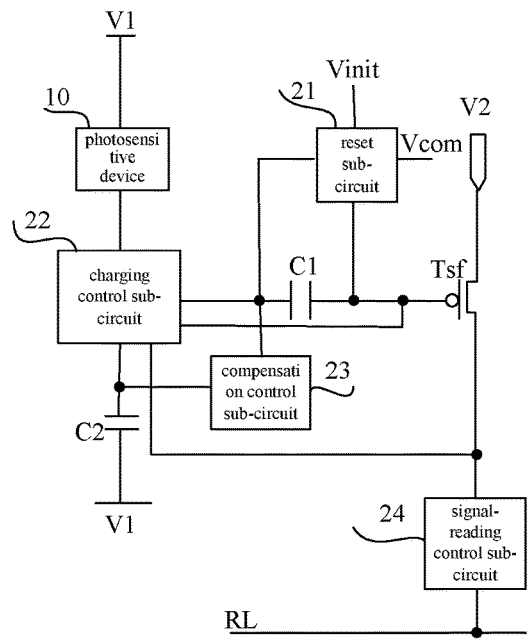
FIG. 1 is a structural diagram of an active pixel sensor circuit according to an embodiment of the present disclosure.

As shown in FIG. 1, an active pixel sensor circuit according to embodiments of the present disclosure comprises a photosensitive device 10, a first storage capacitor C1, a second storage capacitor C2, and a source follower transistor Tsf. A first pole of the photosensitive device 10 is connected to a first level line and the first level line outputs a first level V1. A first terminal of the second storage capacitor C2 is connected to the first level line. A gate of the source follower transistor Tsf is connected to a first terminal of the first storage capacitor C1, a first pole of the source follower transistor Tsf is connected to a second level line, and the second level line outputs a second level V2.

The active pixel sensor circuit further comprises a reset sub-circuit 21, a charging control sub-circuit 22, a compensation control sub-circuit 23, and a signal-reading control sub-circuit 24.

The reset sub-circuit 21 is connected to the first terminal of the first storage capacitor C1 and a second terminal of the first storage capacitor C1, respectively, and configured to control the first terminal of the first storage capacitor C1 to be connected to a first reset voltage line during the reset phase, and control the second terminal of the first storage capacitor C1 to be connected to a second reset voltage line. The first reset voltage line outputs a first reset voltage Vinit, and the second reset voltage line outputs a second reset voltage Vcom.

The charging control sub-circuit 22 is connected to a second pole of the photosensitive device 10, a second terminal of the second storage capacitor C2, a gate of the source follower transistor Tsf, and a second pole of the source follower transistor Tsf, respectively, and configured to control the second pole of the photosensitive device 10 to be connected to the second terminal of the second storage capacitor C2 during the reset phase and a charging phase, and control the gate of the source follower transistor Tsf to be connected to the second pole of the source follower transistor Tsf during the charging phase.

The compensation control sub-circuit 23 is connected to the second terminal of the second storage capacitor C2 and the second terminal of the first storage capacitor C1, respectively, and configured to control the second terminal of the second storage capacitor C2 to be connected to the second terminal of the first storage capacitor C1 during the reset phase and a compensation phase.

The signal-reading control sub-circuit 24 is connected to a photocurrent signal reading line RL and the second pole of the source follower transistor Tsf, respectively, and configured to control the photocurrent signal reading line RL to be connected to the second pole of the source follower transistor Tsf during a signal reading phase.

In FIG. 1, Tsf is a p-type transistor, but in actual operation, Tsf may be an n-type transistor as well.

The active pixel sensor circuit according to embodiments of the present disclosure enables the output current of the source follower transistor to be independent of the threshold voltage thereof by means of voltage jump compensation using a reset sub-circuit, a charging control sub-circuit and a compensation sub-circuit, thereby solving the problem of non-uniform output current resulting from the difference in the source follower transistors per se.

Figure 2:
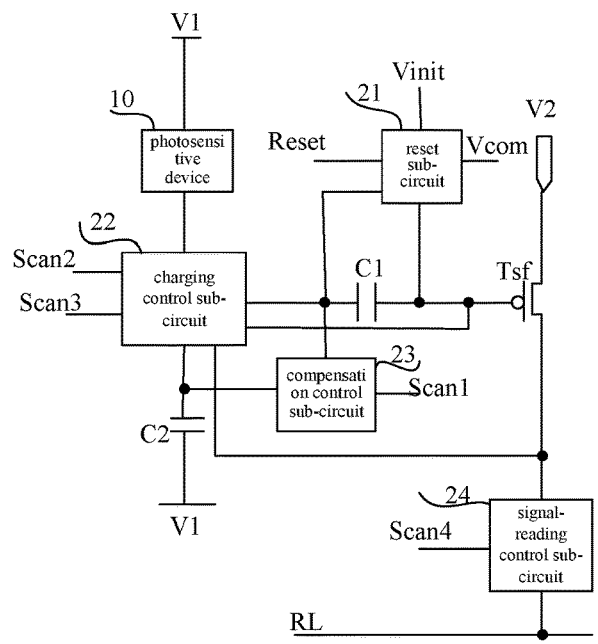
FIG. 2 is a structural diagram of an active pixel sensor circuit according to another embodiment of the present disclosure.

Specifically, as shown in FIG. 2, in the embodiment of the active pixel sensor circuit of the present disclosure, the reset sub-circuit 21 is further connected to a reset control signal line Reset and configured to control the first terminal of the first storage capacitor C1 to be connected to a first reset voltage line under the control of a reset control signal during the reset phase, and control the second terminal of the first storage capacitor C1 to be connected to a second reset voltage line.

The charging control sub-circuit 22 is further connected to a first charging control signal line Scan2 and a second charging control signal line Scan3, respectively, and configured to control the second pole of the photosensitive device 10 to be connected to the second terminal of the second storage capacitor C2 under the control of a first charging control signal during the reset phase and the charging phase, and control the gate of the source follower transistor Tsf to be connected to the second pole of the source follower transistor Tsf under the control of a second charging control signal during the charging phase.

The compensation control sub-circuit 23 is further connected to a compensation control signal line Scan1 and configured to control the second terminal of the second storage capacitor C2 to be connected to the second terminal of the first storage capacitor C1 under the control of a compensation control signal during the reset phase and the compensation phase.

The signal-reading control sub-circuit 24 is further connected to a reading control signal line Scan4 and configured to control the photocurrent signal reading line RL to be connected to the second pole of the source follower transistor Tsf under the control of a reading control signal during the signal reading phase.

In the above embodiment, the reset sub-circuit is connected to the reset control signal line so as to perform a reset operation under the control of the reset control signal. The charging control sub-circuit is connected to the first charging control signal line and the second charging control signal line, respectively so as to perform a charging operation under the control of the first charging control signal and the second charging control signal. The signal-reading control sub-circuit is connected to the reading control signal line so as to perform a signal reading operation under the control of the reading control signal.

In an exemplary embodiment, the reset sub-circuit may comprise a first reset transistor and a second reset transistor.

A gate of the first reset transistor is connected to the reset control signal line, a first pole of the first reset transistor is connected to the first reset voltage line, and a second pole of the first reset transistor is connected to the first terminal of the first storage capacitor.

A gate of the second reset transistor is connected to the reset control signal line, a first pole of the second reset transistor is connected to the second reset voltage line, and a second pole of the second reset transistor is connected to the second terminal of the first storage capacitor.

In an exemplary embodiment, the charging control sub-circuit comprises a first charging control transistor and a second charging control transistor.

A gate of the first charging control transistor is connected to the first charging control signal line, a first pole of the first charging control transistor is connected to the second pole of the photosensitive device, and a second pole of the first charging control transistor is connected to the second terminal of the second storage capacitor.

A gate of the second charging control transistor is connected to the second charging control signal line, a first pole of the second charging control transistor is connected to the gate of the source follower transistor, and a second pole of the second charging control transistor is connected to the second pole of the source follower transistor.

In an exemplary embodiment, the compensation control sub-circuit comprises a compensation control transistor, wherein a gate of the compensation control transistor is connected to the compensation control signal line, a first pole of the compensation control transistor is connected to the second terminal of the first storage capacitor, and a second pole of the compensation control transistor is connected to the second terminal of the second storage capacitor.

In an exemplary embodiment, the signal-reading control sub-circuit comprises a signal-reading control transistor, wherein a gate of the signal-reading control transistor is connected to the reading control signal line, a first pole of the signal-reading control transistor is connected to the second pole of the source follower transistor, and a second pole of the signal-reading control transistor is connected to the photocurrent signal reading line.

In an exemplary embodiment, the photosensitive device comprises a photodiode.

In actual operation, the photosensitive device may also be other types of photosensitive devices as long as the manufacture process of the photosensitive device can be combined with the existing semiconductor manufacturing procedure.

In actual operation, the source follower transistor, the first reset transistor, the second reset transistor, the first charging control transistor, the second charging control transistor, the compensation control transistor, and the signal-reading control transistor may all be p-type transistors. At that time, the second level is a high level, and the first level is a low level. However, in actual operation, the above transistors may also be n-type transistors. The type of the transistors is not limited in embodiments of the present disclosure.

The active pixel sensor circuit of the present disclosure will be described below by way of exemplary embodiments.

Figure 3:
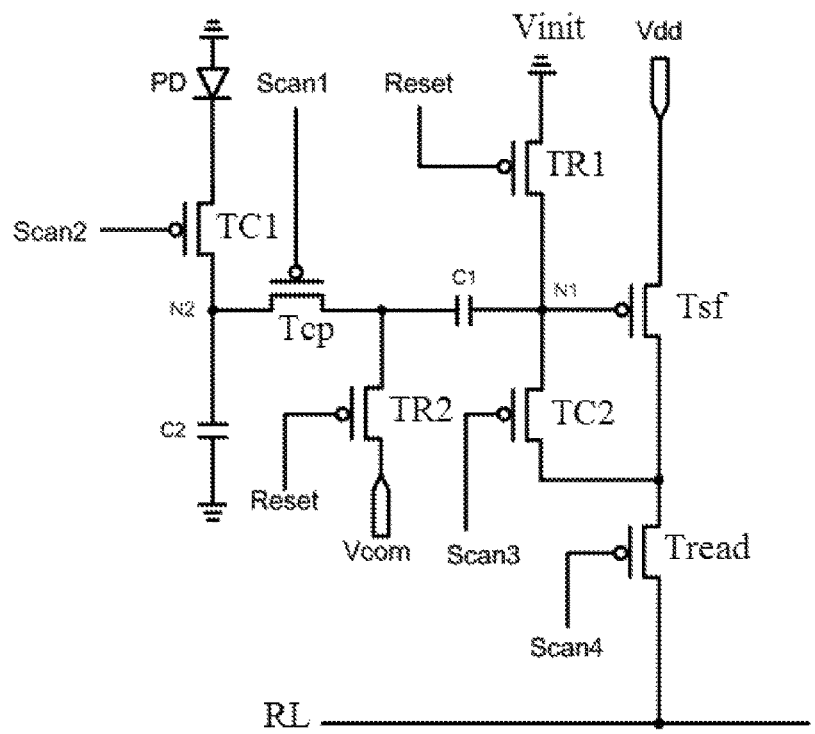
FIG. 3 is a circuit diagram of an active pixel sensor circuit according to an exemplary embodiment of the present disclosure.

As shown in FIG. 3, the active pixel sensor circuit of the present disclosure comprises a photodiode PD, a first storage capacitor C1, a second storage capacitor C2, a source follower transistor Tsf, a reset sub-circuit, a charging control sub-circuit, a compensation control sub-circuit, and a signal-reading control sub-circuit.

In the exemplary embodiment shown in FIG. 3, an anode of the photodiode PD is grounded, the first terminal of the second storage capacitor C2 is grounded, the gate of the source follower transistor Tsf is connected to the first terminal of the first storage capacitor C1, and a high level Vdd is applied to the source of the source follower transistor Tsf.

The reset sub-circuit comprises a first reset transistor TR1 and a second reset transistor TR2.

A gate of the first reset transistor TR1 is connected to the reset control signal line Reset, a source of the first reset transistor TR1 is applied with the first reset voltage Vinit, and a drain of the first reset transistor TR1 is connected to the first terminal of the first storage capacitor C1.

A gate of the second reset transistor TR2 is connected to the reset control signal line Reset, a source of the second reset transistor TR2 is applied with the second reset voltage Vcom, and a drain of the second reset transistor TR2 is connected to the second terminal of the first storage capacitor C1.

The charging control sub-circuit comprises a first charging control transistor TC1 and a second charging control transistor TC2.

A gate of the first charging control transistor TC1 is connected to the first charging control signal line Scan2, a source of the first charging control transistor TC1 is connected to a cathode of the photodiode PD, and a drain of the first charging control transistor TC1 is connected to the second terminal of the second storage capacitor C2.

A gate of the second charging control transistor TC2 is connected to the second charging control signal line Scan3, a source of the second charging control transistor TC2 is connected to the gate of the source follower transistor Tsf, and a drain of the second charging control transistor TC2 is connected to the drain of the source follower transistor Tsf.

The compensation control sub-circuit comprises a compensation control transistor Tcp, wherein a gate of the compensation control transistor Tcp is connected to the compensation control signal line Scan1, a source of the compensation control transistor Tcp is connected to the second terminal of the first storage capacitor C1, and a drain of the compensation control transistor Tcp is connected to the second terminal of the second storage capacitor C2.

The signal-reading control sub-circuit comprises a signal-reading control transistor Tread, wherein a gate of the signal-reading control transistor Tread is connected to the reading control signal line Scan4, a source of the signal-reading control transistor Tread is connected to the drain of the source follower transistor Tsf, and a drain of the signal-reading control transistor Tread is connected to the photocurrent signal reading line RL.

In FIG. 3, a first node N1 is connected to the gate of the source follower transistor Tsf, and a second node N2 is connected to the second terminal of the second storage capacitor C2.

Figure 4:
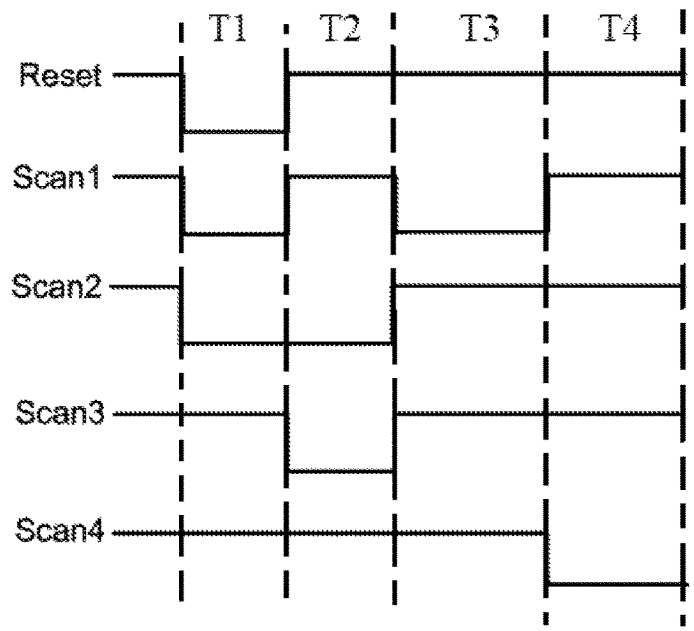
FIG. 4 is an operational timing diagram of the active pixel sensor circuit shown in FIG. 3.

FIG. 4 illustrates an operational timing diagram of the active pixel sensor circuit as shown in FIG. 3.

Figure 5A:
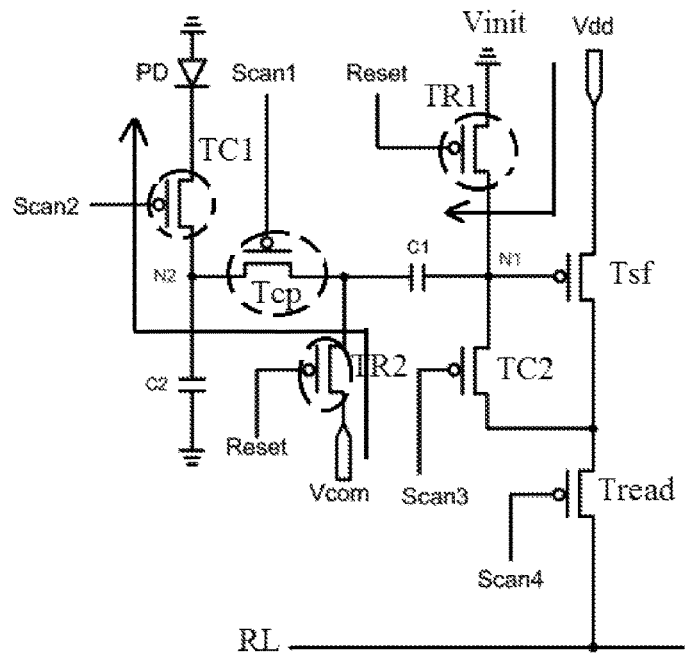
FIGS. 5A, 5B, 5C and 5D are schematic views showing the current flow directions and turn-on of transistors of the active pixel sensor circuit shown in FIG. 3 during the phases T1, T2, T3 and T4 in FIG. 4, respectively.

As shown in FIG. 4, during a reset phase T1 (as shown in FIG. 5A), Reset, Scan1 and Scan2 are all at a low level, and Scan3 and Scan4 are both at a high level. At that time, TR1 is turned on to reset N1 to Vinit (Vinit is an initial low potential, which can be 0 or a negative voltage), and Tcp and TR2 are turned on to reset the potential of N2 to Vcom and further reset the previous voltage signal. Moreover, since TC1 is turned on, the potential Vcom of N2 is written into the cathode of PD via TC1 to control PD to be reversely biased. The resetting performed during the reset phase is to eliminate the signal of a previous frame, thereby preventing the signal of the previous frame from affecting the detection of the next frame.

Figure 5B:
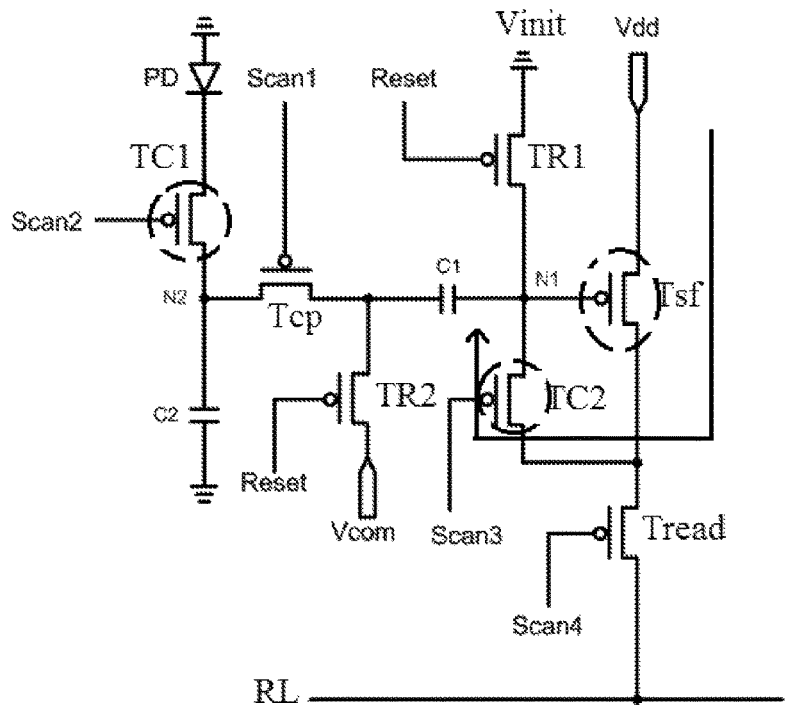

During a charging phase T2 (as shown in FIG. 5B), Reset, Scan1 and Scan4 are all at a high level, and Scan2 and Scan3 are both at a low level. At that time, when the PN junction of PD is irradiated with incident light, the PN junction is excited by the light quantum to produce electron-hole pairs, so that charges on the PN junction capacitor are recombined. Since TC1 is turned on, the potential of N2 decreases to Vdata (Vdata is a photosensitive potential generated after irradiating PD with incident light), and Vdata is stored between two terminals of C2. At the same time, TC2 is turned on to control the gate of Tsf to be connected to the drain of Tsf. Since the gate potential of the source follower transistor Tsf is Vinit at that time, Tsf is turned on, and N1 is charged by Vdd via Tsf and TC2 until the gate potential of Tsf is Vdd−|Vth|, wherein Vth is the threshold voltage of Tsf.

Figure 5C:
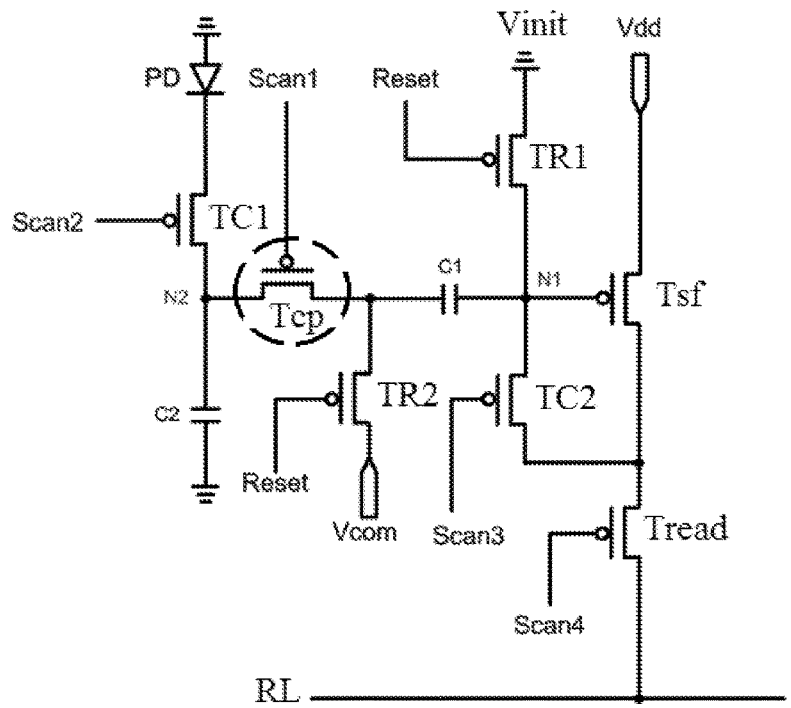

During a compensation phase T3 (as shown in FIG. 5C), Reset, Scan2, Scan3 and Scan4 are all at a high level, and Scan1 is at a low level. At that time, Tcp is turned on so that the potential of the second terminal of C1 is the potential Vdata of N2. Further, since TR2, TC2, Tsf, TC1 and TR1 are all turned off at that time, C1 does not have a charging/discharging path. In the case where the potential of the first terminal of C1 is Vdata, since C1 needs to keep a potential difference (i.e. Vdd−|Vth|) between two terminals unchanged, the potential of N1 will undergo an equal-voltage jump so that the potential of N1 jumps to Vdd−|Vth|+Vdata.

Figure 5D:
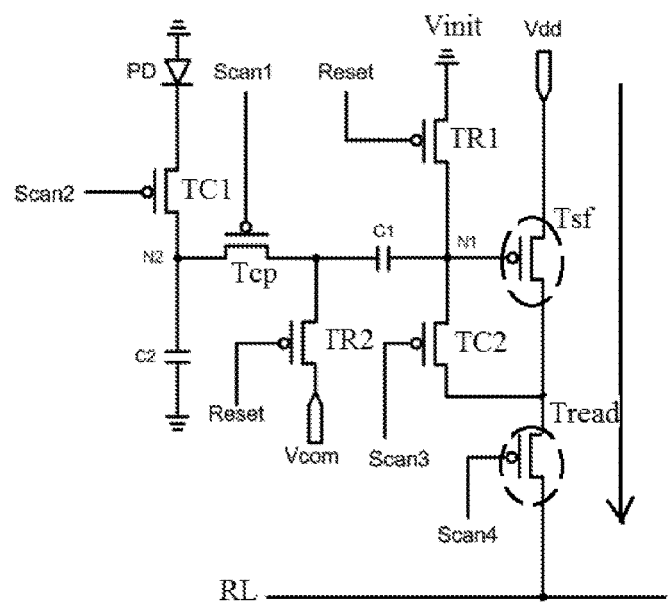

During a signal reading phase T4 (as shown in FIG. 5D), Reset, Scan1, Scan2 and Scan3 are all at a high level, and Scan4 is at a low level. At that time, Tread is turned on, Vdd is applied to the source of Tsf, and the drain of Tsf is connected to RL. Since the potential of N1 is Vdd−|Vth|+Vdata, a turn-on current I (i.e. photocurrent signal) of Tsf is read by RL via Tsf and Tread as:

$$I=K(V_{SG}-|Vth|)^2=K[Vdd-(Vdd-|Vth|+V\text{data})-|Vth|]^2=K(V\text{data})^2$$

wherein K is the current coefficient of Tsf and $V_{SG}$ is the source-gate voltage of Tsf.

As can be seen from the above equation, at that time, I is already not affected by the threshold voltage of the source follower transistor Tsf, but only related to Vdata, while Vdata is directly generated by irradiating the PN junction of the photodiode PD with light and is not related to the source follower transistor Tsf. Consequently, the problem of threshold voltage offset resulting from the manufacturing procedure and the long time operation of the source follower transistor Tsf can be completely solved, ensuring the accuracy of the photocurrent signal.

It is to be noted that, FIGS. 5A, 5B, 5C and 5D are schematic views showing the current flow directions and turn-on of transistors of the active pixel sensor circuit shown in FIG. 3 during the phases T1, T2, T3 and T4 in FIG. 4, respectively. In FIGS. 5A, 5B, 5C and 5D, the transistors enclosed by the dashed circles are turned on.

Embodiments of the present disclosure further provide a driving method for an active pixel sensor circuit for use in the active pixel sensor circuit described above. The driving method comprises a reset step, a charging step, a compensation step and a signal reading step.

In the reset step, during the reset phase, the reset sub-circuit controls the first reset voltage to be written into the first terminal of the first storage capacitor and controls the second reset voltage to be written into the second terminal of the first storage capacitor. The compensation control sub-circuit controls the second reset voltage to be written into the second terminal of the second storage capacitor. The charging control sub-circuit controls the second reset voltage to be written into the second pole of the photosensitive device so that the photosensitive device is reversely biased.

In the charging step, during the charging phase, the charging control sub-circuit controls the second pole of the photosensitive device to be connected to the second terminal of the second storage capacitor, and the photosensitive device is irradiated with incident light, so that potential of the second terminal of the second storage capacitor becomes a photosensitive potential Vdata. The photosensitive potential Vdata is stored in the second storage capacitor. The charging control sub-circuit further controls the gate of the source follower transistor to be connected to the second pole of the source follower transistor. At that time the gate potential of the source follower transistor is the first reset voltage so that the source follower transistor is turned on until the gate potential of the source follower transistor is V2−|Vth|, wherein V2 is the second level and Vth is the threshold voltage of the source follower transistor.

In the compensation step, during the compensation phase, the compensation control sub-circuit controls the second terminal of the second storage capacitor to be connected to the second terminal of the first storage capacitor, so that the photosensitive potential Vdata stored in the second storage capacitor is written into the second terminal of the first storage capacitor. The potential of the first terminal of the first storage capacitor undergoes an equal-voltage jump such that the gate potential of the source follower transistor jumps to V2−|Vth|+Vdata.

In the signal reading step, during the signal reading phase, the signal-reading control sub-circuit controls the photocurrent signal reading line to be connected to the second pole of the source follower transistor, and the source follower transistor is turned on. At that time, the gate-source voltage of the source follower transistor compensates the threshold voltage of the source follower transistor so that the operating current of the source follower transistor is independent of the threshold voltage and is read via the photocurrent signal reading line.

The driving method for an active pixel sensor circuit according to embodiments of the present disclosure enables the gate-source voltage of the source follower transistor to compensate the threshold voltage of the source follower transistor during the signal reading phase, so that the operating current of the source follower transistor is independent of the threshold voltage.

Embodiments of the present disclosure further provide a driving method for an active pixel sensor circuit for use in the active pixel sensor circuit as shown in FIG. 3. The driving method comprises a reset step, a charging step, a compensation step and a signal reading step.

In the reset step, during the reset phase, the reset control signal, the first charging control signal and the compensation control signal are all at a low level, and the first reset transistor, the second reset transistor, the first charging control transistor and the compensation control transistor are all turned on. The first reset voltage is written into the first terminal of the first storage capacitor and the second storage capacitor is connected to the cathode of the photodiode, so that the photodiode is reversely biased and the PN junction capacitor of the photodiode is charged by the second reset voltage.

In the charging step, during the charging phase, the first charging control signal and the second charging control signal are both at a low level, the first charging control transistor and the second charging control transistor are both turned on, and the photodiode is irradiated with incident light so that the potential of the second terminal of the second storage capacitor becomes a photosensitive potential Vdata which is stored in the second storage capacitor. At that time, the gate potential of the source follower transistor is the first reset voltage so that the source follower transistor is turned on until the gate potential of the source follower transistor is Vdd−|Vth|, wherein Vdd is a high level applied to the first pole of the source follower transistor and Vth is the threshold voltage of the source follower transistor.

In the compensation step, during the compensation phase, the compensation control signal is at a low level, thus the compensation control transistor is turned on so that the photosensitive potential Vdata stored in the second storage capacitor is written into the second terminal of the first storage capacitor. The potential of the first terminal of the first storage capacitor undergoes an equal-voltage jump so that the gate potential of the source follower transistor jumps to Vdd−|Vth|+Vdata. In the signal reading step, during the signal reading phase, the reading control signal is at a low level, thus the signal-reading control transistor is turned on. At that time, the gate potential of the source follower transistor is Vdd−|Vth|+Vdata, the source follower transistor is turned on, and the operating current of the source follower transistor is K×Vdata². The operating current is read via the photocurrent signal reading line, wherein K is the current coefficient of the source follower transistor.

In an exemplary embodiment, the reset step further comprises: during the reset phase, the second charging control signal and the reading control signal both at a high level, and the second charging control transistor and the signal-reading control transistor are both turned off.

The charging step further comprises: during the charging phase, the reset control signal, the compensation control signal and the reading control signal are all at a high level, and the first reset transistor, the second reset transistor, the compensation control transistor and the signal-reading control transistor are all turned off.

The compensation step further comprises: during the compensation phase, the reset control signal, the first charging control signal, the second charging control signal and the reading control signal are all at a high level, and the first reset transistor, the second reset transistor, the first charging control transistor, the second charging control transistor and the signal-reading control transistor are all turned off.

The signal reading step further comprises: during the signal reading phase, the reset control signal, the first charging control signal, the second charging control signal and the compensation control signal are all at a high level, and the first reset transistor, the second reset transistor, the first charging control transistor, the compensation control transistor and the second charging control transistor are all turned off.

Embodiments of the present disclosure further provide an image sensor comprising the active pixel sensor circuit described above.

The foregoing embodiments are exemplary embodiments of the present disclosure. It is to be noted that many improvements and modifications may be further made by those ordinarily skilled in the art without departing from the principle set forth in the present disclosure, and such improvements and modifications should be considered to be within the scope of the present disclosure.

The invention claimed is:

1. An active pixel sensor circuit comprising: a photosensitive device, a first storage capacitor, a second storage capacitor, a source follower transistor, a reset sub-circuit, a charging control sub-circuit, a compensation control sub-circuit, and a signal-reading control sub-circuit, wherein a first pole of the photosensitive device is connected to a first level line;

a first terminal of the second storage capacitor is connected to the first level line;

a gate of the source follower transistor is connected to a first terminal of the first storage capacitor, and a first pole of the source follower transistor is connected to a second level line;

the reset sub-circuit is connected to the first terminal of the first storage capacitor and a second terminal of the first storage capacitor, respectively and configured to control the first terminal of the first storage capacitor to be connected to a first reset voltage line during a reset phase, and control the second terminal of the first storage capacitor be connected to a second reset voltage line;

the charging control sub-circuit is connected to a second pole of the photosensitive device, a second terminal of the second storage capacitor, the gate of the source follower transistor and a second pole of the source follower transistor, respectively and configured to control the second pole of the photosensitive device to be connected to the second terminal of the second storage capacitor during the reset phase and a charging phase, and control the gate of the source follower transistor to be connected to the second pole of the source follower transistor during the charging phase;

the compensation control sub-circuit is connected to the second terminal of the second storage capacitor and the second terminal of the first storage capacitor, respectively and configured to control the second terminal of the second storage capacitor to be connected to the second terminal of the first storage capacitor during the reset phase and a compensation phase; and the signal-reading control sub-circuit is connected to a photocurrent signal reading line and the second pole of the source follower transistor, respectively and configured to control the photocurrent signal reading line to be connected to the second pole of the source follower transistor during a signal reading phase.

2. The active pixel sensor circuit according to claim 1, wherein the reset sub-circuit is further connected to a reset control signal line and configured to control the first terminal of the first storage capacitor to be connected to the first reset voltage line under the control of a reset control signal during the reset phase, and control the second terminal of the first storage capacitor to be connected to the second reset voltage line;

the charging control sub-circuit is further connected to a first charging control signal line and a second charging control signal line, respectively and configured to control the second pole of the photosensitive device to be connected to the second terminal of the second storage capacitor under the control of a first charging control signal during the reset phase and the charging phase, and control the gate of the source follower transistor to be connected to the second pole of the source follower transistor under the control of a second charging control signal during the charging phase;

the compensation control sub-circuit is further connected to a compensation control signal line and configured to control the second terminal of the second storage capacitor to be connected to the second terminal of the first storage capacitor under the control of a compensation control signal during the reset phase and the compensation phase; and the signal-reading control sub-circuit is further connected to a reading control signal line and configured to control the photocurrent signal reading line to be connected to the second pole of the source follower transistor under the control of a reading control signal during the signal reading phase.

3. The active pixel sensor circuit according to claim 2, wherein the reset sub-circuit comprises:

a first reset transistor, wherein a gate of the first reset transistor is connected to the reset control signal line, a first pole of the first reset transistor is connected to the first reset voltage line, and a second pole of the first reset transistor is connected to the first terminal of the first storage capacitor; and a second reset transistor, wherein a gate of the second reset transistor is connected to the reset control signal line, a first pole of the second reset transistor is connected to the second reset voltage line, and a second pole of the second reset transistor is connected to the second terminal of the first storage capacitor.

4. The active pixel sensor circuit according to claim 3, wherein the charging control sub-circuit comprises:

a first charging control transistor, wherein a gate of the first charging control transistor is connected to the first charging control signal line, a first pole of the first charging control transistor is connected to the second pole of the photosensitive device, and a second pole of the first charging control transistor is connected to the second terminal of the second storage capacitor; and a second charging control transistor, wherein a gate of the second charging control transistor is connected to the second charging control signal line, a first pole of the second charging control transistor is connected to the gate of the source follower transistor, and a second pole of the second charging control transistor is connected to the second pole of the source follower transistor.

5. The active pixel sensor circuit according to claim 4, wherein the compensation control sub-circuit comprises a compensation control transistor, wherein a gate of the compensation control transistor is connected to the compensation control signal line, a first pole of the compensation control transistor is connected to the second terminal of the first storage capacitor, and a second pole of the compensation control transistor is connected to the second terminal of the second storage capacitor.

6. The active pixel sensor circuit according to claim 5, wherein the signal-reading control sub-circuit comprises a signal-reading control transistor, wherein a gate of the signal-reading control transistor is connected to the reading control signal line, a first pole of the signal-reading control transistor is connected to the second pole of the source follower transistor, and a second pole of the signal-reading control transistor is connected to the photocurrent signal reading line.

7. The active pixel sensor circuit according to claim 1, wherein the photosensitive device comprises a photodiode.

8. The active pixel sensor circuit according to claim 6, wherein the source follower transistor, the first reset transistor, the second reset transistor, the first charging control transistor, the second charging control transistor, the compensation control transistor, and the signal-reading control transistor are all p-type transistors, a second level is a high level, and a first level is a low level.

9. A driving method of an active pixel sensor circuit for use in the active pixel sensor circuit according to claim 1, the driving method comprising:

a reset step in which during the reset phase the reset sub-circuit controls a first reset voltage to be written into the first terminal of the first storage capacitor and controls a second reset voltage to be written into the second terminal of the first storage capacitor; the compensation control sub-circuit controls the second reset voltage to be written into the second terminal of the second storage capacitor; the charging control sub-circuit controls the second reset voltage to be written into the second pole of the photosensitive device so that the photosensitive device is reversely biased;

a charging step in which during the charging phase, the charging control sub-circuit controls the second pole of the photosensitive device to be connected to the second terminal of the second storage capacitor; the photosensitive device is irradiated with incident light so that a potential of the second terminal of the second storage capacitor becomes a photosensitive potential; the photosensitive potential is stored in the second storage capacitor; the charging control sub-circuit further controls the gate of the source follower transistor to be connected to the second pole of the source follower transistor so that the source follower transistor is turned on until a potential of the gate of the source follower transistor is V2−|Vth|, wherein V2 is the second level and Vth is a threshold voltage of the source follower transistor;

a compensation step in which during the compensation phase the compensation control sub-circuit controls the second terminal of the second storage capacitor to be connected to the second terminal of the first storage capacitor so that the photosensitive potential stored in the second storage capacitor is written into the second terminal of the first storage capacitor, and the potential of the gate of the source follower transistor jumps to V2−|Vth|+Vdata, wherein Vdata is the photosensitive potential;

a signal reading step in which during the signal reading phase the signal-reading control sub-circuit controls the photocurrent signal reading line to be connected to the second pole of the source follower transistor; the source follower transistor is turned on so that an operating current of the source follower transistor is independent of the threshold voltage of the source follower transistor, and the operating current is read via the photocurrent signal reading line.

10. A driving method of an active pixel sensor circuit for use in the active pixel sensor circuit according to claim 8, the driving method comprising:

a reset step in which during the reset phase the reset control signal, the first charging control signal and the compensation control signal are all at a low level, and the first reset transistor, the second reset transistor, the first charging control transistor and the compensation control transistor are all turned on; a first reset voltage is written into the first terminal of the first storage capacitor, and the second storage capacitor is connected to a cathode of the photodiode so that the photodiode is reversely biased, and a PN junction capacitor of the photodiode is charged by a second reset voltage;

a charging step in which during the charging phase the first charging control signal and the second charging control signal are both at a low level, and the first charging control transistor and the second charging control transistor are both turned on; the photodiode is irradiated with incident light so that a potential of the second terminal of the second storage capacitor becomes a photosensitive potential and the photosensitive potential is stored in the second storage capacitor; the source follower transistor is turned on until a potential of the gate of the source follower transistor is Vdd−|Vth|, wherein Vdd is a high level applied to the first pole of the source follower transistor, and Vth is a threshold voltage of the source follower transistor;

a compensation step in which during the compensation phase the compensation control signal is at a low level, and the compensation control transistor is turned on so that the photosensitive potential stored in the second storage capacitor is written into the second terminal of the first storage capacitor; a potential of the first terminal of the first storage capacitor undergoes an equal-voltage jump such that the potential of the gate of the source follower transistor jumps to Vdd−|Vth|+Vdata, wherein Vdata is the photosensitive potential;

a signal reading step in which during the signal reading phase the reading control signal is at a low level, the signal-reading control transistor is turned on, and at that time the potential of the gate of the source follower transistor is Vdd−|Vth|+Vdata; the source follower transistor is turned on, an operating current of the source follower transistor is K×Vdata$^2$, and the operating current is read via the photocurrent signal reading line, wherein K is a current coefficient of the source follower transistor.

11. The driving method of an active pixel sensor circuit according to claim 10, wherein the reset step further comprises: during the reset phase, the second charging control signal and the reading control signal are both at a high level, and the second charging control transistor and the signal-reading control transistor are both turned off;

the charging step further comprises: during the charging phase, the reset control signal, the compensation control signal and the reading control signal are all at a high level, and the first reset transistor, the second reset transistor, the compensation control transistor and the signal-reading control transistor are all turned off;

the compensation step further comprises: during the compensation phase, the reset control signal, the first charging control signal, the second charging control signal, and the reading control signal are all at a high level, and the first reset transistor, the second reset transistor, the first charging control transistor, the second charging control transistor, and the signal-reading control transistor are all turned off;

the signal reading step further comprises: during the signal reading phase, the reset control signal, the first charging control signal, the second charging control signal, and the compensation control signal are all at a high level, and the first reset transistor, the second reset transistor, the first charging control transistor, the compensation control transistor, and the second charging control transistor are all turned off.

12. An image sensor comprising the active pixel sensor circuit according to claim 1.

13. The image sensor according to claim 12, wherein the reset sub-circuit is further connected to a reset control signal line and configured to control the first terminal of the first storage capacitor to be connected to the first reset voltage line under the control of a reset control signal during the reset phase, and control the second terminal of the first storage capacitor to be connected to the second reset voltage line;

the charging control sub-circuit is further connected to a first charging control signal line and a second charging control signal line, respectively and configured to control the second pole of the photosensitive device to be connected to the second terminal of the second storage capacitor under the control of a first charging control signal during the reset phase and the charging phase, and control the gate of the source follower transistor to be connected to the second pole of the source follower transistor under the control of a second charging control signal during the charging phase;

the compensation control sub-circuit is further connected to a compensation control signal line and configured to control the second terminal of the second storage capacitor to be connected to the second terminal of the first storage capacitor under the control of a compensation control signal during the reset phase and the compensation phase; and the signal-reading control sub-circuit is further connected to a reading control signal line and configured to control the photocurrent signal reading line to be connected to the second pole of the source follower transistor under the control of a reading control signal during the signal reading phase.

14. The image sensor according to claim 13, wherein the reset sub-circuit comprises:

a first reset transistor, wherein a gate of the first reset transistor is connected to the reset control signal line, a first pole of the first reset transistor is connected to the first reset voltage line, and a second pole of the first reset transistor is connected to the first terminal of the first storage capacitor; and a second reset transistor, wherein a gate of the second reset transistor is connected to the reset control signal line, a first pole of the second reset transistor is connected to the second reset voltage line, and a second pole of the second reset transistor is connected to the second terminal of the first storage capacitor.

15. The image sensor according to claim 14, wherein the charging control sub-circuit comprises:

a first charging control transistor, wherein a gate of the first charging control transistor is connected to the first charging control signal line, a first pole of the first charging control transistor is connected to the second pole of the photosensitive device, and a second pole of the first charging control transistor is connected to the second terminal of the second storage capacitor; and a second charging control transistor, wherein a gate of the second charging control transistor is connected to the second charging control signal line, a first pole of the second charging control transistor is connected to the gate of the source follower transistor, and a second pole of the second charging control transistor is connected to the second pole of the source follower transistor.

16. The image sensor according to claim 15, wherein the compensation control sub-circuit comprises a compensation control transistor, wherein a gate of the compensation control transistor is connected to the compensation control signal line, a first pole of the compensation control transistor is connected to the second terminal of the first storage capacitor, and a second pole of the compensation control transistor is connected to the second terminal of the second storage capacitor.

17. The image sensor according to claim 16, wherein the signal-reading control sub-circuit comprises a signal-reading control transistor, wherein a gate of the signal-reading control transistor is connected to the reading control signal line, a first pole of the signal-reading control transistor is connected to the second pole of the source follower transistor, and a second pole of the signal-reading control transistor is connected to the photocurrent signal reading line.

18. The image sensor according to claim 12, wherein the photosensitive device comprises a photodiode.

19. The image sensor according to claim 17, wherein the source follower transistor, the first reset transistor, the second reset transistor, the first charging control transistor, the second charging control transistor, the compensation control transistor, and the signal-reading control transistor are all p-type transistors, a second level is a high level, and a first level is a low level.

20. The active pixel sensor circuit according to claim 2, wherein the photosensitive device comprises a photodiode.

* * * * *